US00RE34430E

United States Patent [19]

Mosquera et al.

[11] E Patent Number: Re. 34,430

[45] Reissued Date of Patent: Nov. 2, 1993

[54] FLOATING PANEL MOUNT FOR ELECTRICAL CONNECTOR

[75] Inventors: Rene A. Mosquera, Laguna Niguel; Wayne A. Zahlit, Mission Viejo, both of Calif.

[73] Assignee: Molex Incorporated, Lisle, Ill.

[21] Appl. No.: 684,523

[22] Filed: Apr. 10, 1991

Related U.S. Patent Documents

Reissue of:

[64] Patent No.: 4,820,180
Issued: Apr. 11, 1989
Appl. No.: 204,481
Filed: Jun. 9, 1988

[51] Int. Cl.[5] ..... H01R 13/74

[52] U.S. Cl. ..... 439/248; 439/557; 248/27.3

[58] Field of Search ..... 248/27.3; 439/247, 248, 439/353, 354, 357, 557, 558, 527, 544, 552, 554, 555, 567, 571, 572

[56] References Cited

U.S. PATENT DOCUMENTS

| | | | |
|---|---|---|---|
| 1,987,035 | 1/1935 | Tideman | 247/25 |
| 2,891,103 | 6/1959 | Swengel | 174/153 |
| 3,179,737 | 4/1965 | Lyon | 174/50 |
| 3,213,189 | 10/1965 | Mitchell et al. | 174/138 |
| 3,281,753 | 10/1966 | Fink | 339/49 |
| 3,289,145 | 11/1966 | Ruehlemann et al. | 339/176 |
| 3,337,836 | 8/1967 | Churla, Jr. | 339/49 |
| 3,391,376 | 7/1968 | Hammell et al. | 339/17 |
| 3,514,743 | 5/1970 | Schantz | 339/128 |
| 3,543,219 | 11/1970 | Pautrie | 339/91 |
| 3,560,908 | 2/1971 | Dell et al. | 339/91 |
| 3,645,353 | 2/1972 | Cope et al. | 180/90 |
| 3,776,495 | 12/1973 | Hartz et al. | 248/71 |
| 3,790,923 | 2/1974 | Mathe | 339/128 |
| 3,824,524 | 7/1974 | Glover | 339/60 R |
| 3,941,444 | 3/1976 | Bruni et al. | 339/60 M |
| 3,989,343 | 11/1976 | Lucius et al. | 339/128 |
| 4,389,021 | 6/1983 | Coldren | 339/126 R |
| 4,443,048 | 4/1984 | Moist, Jr. | 339/63 M |
| 4,560,227 | 12/1985 | Bukala | 339/147 R |
| 4,755,149 | 7/1988 | deJong et al. | 439/248 |
| 4,761,144 | 8/1988 | Hunt, III et al. | 439/545 |
| 4,812,133 | 3/1989 | Fleak | 439/248 |
| 4,824,387 | 4/1989 | deJong et al. | 439/248 |

FOREIGN PATENT DOCUMENTS

| | | |
|---|---|---|
| 0020834 | 1/1981 | European Pat. Off. . |
| 258382 | 11/1967 | Fed. Rep. of Germany . |
| 2547951 | 5/1977 | Fed. Rep. of Germany . |

OTHER PUBLICATIONS

IBM Technical Disclosure Bulletin, vol. 29, No. 9, Feb. 1987, "Interchangeable Means for Holding a Circuit Card to a Framework".

AMP Instruction Sheet IS7982, Released Feb. 13, 1984 "AMP*Extraction Tool 458994—1".

*Primary Examiner*—Gary F. Paumen
*Attorney, Agent, or Firm*—A. A. Tirva

[57] ABSTRACT

A floating panel mount for an electrical connector comprises opposed pairs of multiple cantilevered latch structures. Each latch structure comprises a lower arm cantilevered from a mounting flange. An upper arm is cantilevered from the end of the lower arm remote from the mounting flange, and is angularly aligned thereto. A locking arm is cantilevered from the end of the upper arm remote from the lower arm such that the lower arm and the locking arm extend angularly from opposed ends of the upper arm and from opposite sides thereof. The maximum cross-sectional dimension defined by the upper and locking arms exceeds the maximum cross-sectional dimension of a mounting aperture in a panel. However, the cross-sectional dimensions defined by the upper arms is substantially less than the cross-sectional dimensions of the mounting aperture. The arms can be deflected to enable the latch structures to pass through the mounting aperture. Thereafter, the latch structures will return to their unbiased, undeflected condition such that the panel is engaged intermediate the locking arms and the mounting flange. However, the smaller cross-sectional dimensions of the upper arms enables float relative to the panel.

29 Claims, 4 Drawing Sheets

FIG.4a
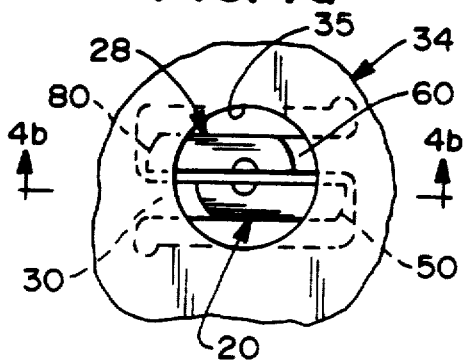
FIG.4b
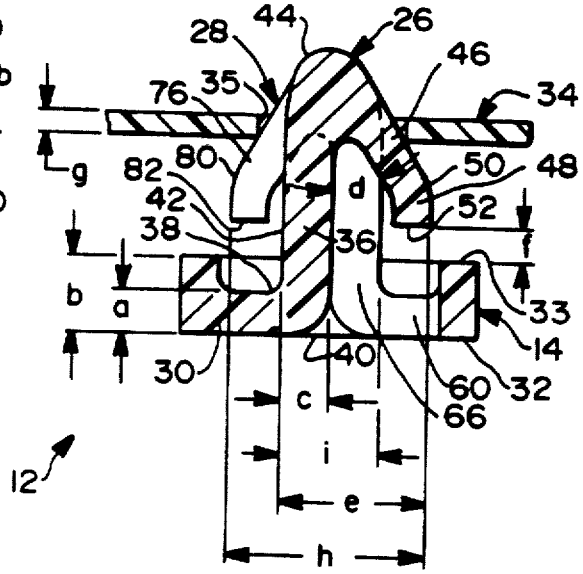
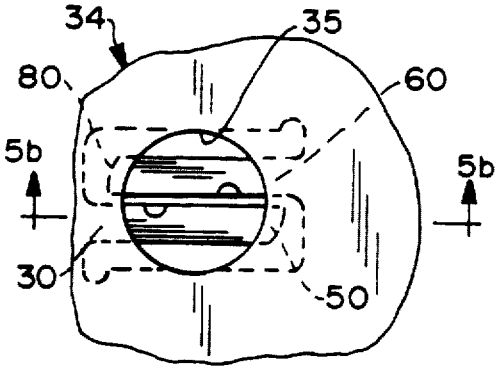
FIG.5a
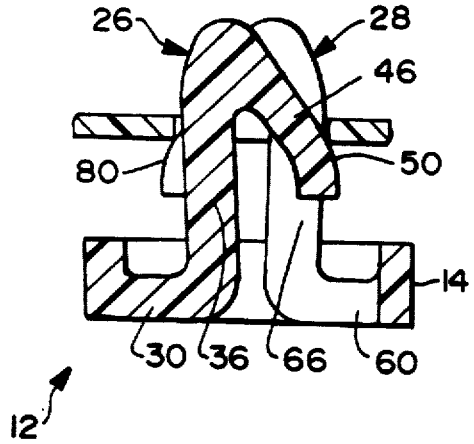
FIG.5b

FLOATING PANEL MOUNT FOR ELECTRICAL CONNECTOR

Matter enclosed in heavy brackets [ ] appears in the original patent but forms no part of this reissue specification; matter printed in italics indicates the additions made by reissue.

BACKGROUND OF THE INVENTION

Electrical connectors comprise opposed mateable male and female electrical connector halves, each of which comprises a nonconductive or dielectric housing and at least one electrical terminal securely mounted therein. Electrical conductors or wire leads are joined to the terminals mounted in the housings, and may further be mechanically joined to the housing itself to achieve a strain relief connection. The nonconductive housing of at least one half of the electrical connector typically may be amounted to a panel. Many connectors such as drawer connectors, include a pair of panel mounted connector halves which are mateable with one another by movement of at least one of the panels toward the other.

The nonconductive housings typically are molded from a suitable plastic material, and preferably define a unitary molded plastic structure. The opposed mateable connector housings typically include appropriate guide structures for guiding the two mateable connector halves into a mated electrical connection. To facilitate this initial mechanical alignment of the connector housings, at least one connector half, and typically the male connector half, is provided with a floating mount to the panel.

Many types of mounting members have been provided to achieve a float mounting for electrical connectors. One such float mounting assembly of fairly complex construction is shown in U.S. Pat. No. 4,647,130 which issued to Blair et al on Mar. 3, 1987. The drawer connector shown in U.S. Pat. No. 4,647,130 comprises an enlarged flange aperture having an elliptical elastomeric insert therein. A screw with a diameter smaller than that of the aperture in the connector is employed to mount the connector to a panel. Thus, float in the direction of the major axis of the elliptical insert can be achieved. The float connector shown in U.S. Pat. No. 4,647,130 is considered undesirable in that it includes a plurality of separate components which must be assembled, and because the float is limited to movement parallel to the long axis of the elliptical insert. The connector shown in U.S. Pat. No. 4,647,130 can be removed from the panel only by disassembling the plural parts required for the float mount assembly.

Some prior art connectors have recognized the desirable objective of molding both the connector housing and the mounting means as a unitary plastic structure. Connectors of this type have included a generally planar mounting flange intended to be mounted in face-to-face contact with a panel. A mounting peg extends generally orthogonally from the mounting flange of the connector housing and is unitary therewith. The mounting pegs of these prior art connectors have been defined by two generally symmetrical spaced apart halves with the plane of symmetry extending generally orthogonal to the mounting flange of the connector, such that the respective halves of the mounting peg are slightly spaced from one another. With this construction, the peg halves of the prior art connector are cantilevered and can deflect slightly toward one another. The end of the prior art mounting peg remote from the mounting flange is enlarged and defines a cross-sectional dimension slightly greater than a corresponding aperture in the panel. This enlarged end of the prior art mounting peg has been appropriately tapered or ramped, such that movement of the prior art mounting peg toward the aperture in the panel deflects the peg halves toward one another to permit the enlarged head to pass through the aperture in the panel. After sufficient insertion of the prior art mounting peg into the aperture, the enlarged head passes the opposed sides of the panel, and the biased peg halves return to their initial position, with the enlarged head holding the connector to the panel.

Prior art mounting pegs as described above have been effective for holding the connector to the panel. However, the construction of these prior art mounting pegs generally has required a substantial amount of force to mount the connector to the panel, and a corresponding or greater difficulty in removing a connector from a panel. The substantial forces required to mount the prior art mounting peg connector to a panel creates the potential for damage to either the connector or the panel, while a similar probability of damage exists during removal of the connector from the panel. Thus, the prior art mounting peg systems have been designed and used primarily to achieve a secure and substantially permanent mounting of the connector to the panel. Prior art mounting pegs of this type generally cannot be provided with a large enough latching shoulder diameter and a sufficient inward compression of the mounting peg halves toward one another to provide the amount of float required for many connectors, such as drawer connectors. In short, mounting pegs, as described above, are provided to hold connectors securely and substantially permanently, and not to achieve float. The prior art mounting members intended to achieve a significant amount of float, have typically been more complex structures, such as those in U.S. Pat. No. 4,647,130.

In view of the above, it is an object of the subject invention to provide a floating panel mount structure that can be molded unitarily with an electrical connector housing.

It is another object of the subject invention to provide an integrally molded floating panel mount that can easily be mounted to or removed from a panel.

An additional object of the subject invention is to provide a panel mount construction that can achieve a large amount of rotational float in all directions within the plane of the panel.

Still a further object of the subject invention is to provide an integrally molded floating panel mount having a pair of multiple cantilevered latch structures for both holding the connector to a panel and permitting relative float therebetween.

SUMMARY OF THE INVENTION

The subject invention is directed to a floating panel mount for an electrical connector. The subject panel mount may be unitarily molded with the electrical connector or may comprise a unitarily molded mounting structure which may be used in combination with a separate electrical connector. The panel mount enables positive retention of the connector to the associated panel, but also permits free rotational movement of the connector within the plane of the panel. Additionally, the panel mount enables both relatively low force mounting of the connector to the panel and easy removal of a mounted connector from the panel.

The floating panel mount comprises at least one pair of opposed multiple cantilevered latch structures, with each multiple cantilevered latch structure comprising a plurality of independently deflectable cantilevered arms. A pair of the multiple cantilevered latch structures may be disposed in opposed relationship, as explained further below, such that each latch structure undergoes plural independent cantilevered deflection during the mounting of a connector to a panel.

Each multiple cantilevered latch structure may comprise a mounting flange which may be an integral part of an electrical connector housing. The mounting flange may be a generally planar structure disposed to be parallel to and/or in face-to-face contact with a panel to which the connector is mounted.

A lower arm is cantilevered from the mounting flange. More particularly, the cantilevered lower arm may be integral with the mounting flange and may be disposed to be generally parallel to the panel, but preferably is spaced from the panel. Thus, for example, the cantilevered lower arm may be generally in the plane of the mounting flange, but may be of thinner construction than the mounting flange to enable the lower arm to be readily deflectable relative to the mounting flange. With this construction, the cantilevered lower arm may be deflected toward the panel when the mounting flange is in face-to-face contact with the panel.

An upper arm is cantilevered from a location on the lower arm remote from the mounting flange, such that the upper and lower arms are independently deflectable relative to one another. The cantilevered upper arm may be integral with and angularly aligned to the lower arm. In particular, the upper arm may be generally orthogonal to the mounting flange to extend generally toward a mounting aperture in the panel to which the electrical connector is to be mounted. The intersection of the cantilevered upper and lower arms may be generally arcuate and may define opposed generally concave and convex corners. The surface of the upper arm extending from the concave corner between the upper and lower arms may define a leading cam surface at locations thereon remote from the lower arm. The configuration of the leading cam surface may be selected to conform to the configuration of the mounting aperture in the panel. In particular, the leading cam surface may be generally convexly arcuate for a panel having a circular mounting aperture therein. As will be explained further below, the leading cam surface of the cantilevered upper arm may facilitate the initial guiding and deflection of the multiple cantilevered latch structure during mounting of an electrical connector to a panel.

A locking arm is cantilevered from a location on the upper arm remote from the lower arm. The cantilevered locking arm may be integral with and acutely angularly aligned to the upper arm, such that the locking arm extends generally back toward the mounting flange of the multiple cantilevered latch structure. More particularly, the lower arm and the locking arm may extend angularly from opposed ends and opposed sides of the upper arm. The intersection of the upper arm and the locking arm also defines opposed concave and convex corners. The convex corner of the intersection between the upper and locking arms preferably is arcuate, and preferably extends from and defines a portion of the leading cam surface of the multiple cantilevered latch structure.

The end of the cantilevered locking arm remote from the upper arm preferably is of nonlinear construction. For example, the end of the locking arm may be disposed in generally parallel alignment to the cantilevered upper arm. As a result of this configuration, a portion of the cantilevered locking arm remote from the upper arm may define a trailing cam surface. The trailing cam surface along the cantilevered locking arm may be generally arcuate, and may be disposed on the latch structure of the subject invention to generate multiple cantilevered deflections as the latch structure is urged through the mounting aperture as explained herein. Additionally, the maximum cross-sectional dimension defined by the upper arm and the locking arm cantilevered therefrom may be slightly greater than the cross-sectional dimension of the mounting aperture in the panel.

The extreme end of the cantilevered locking arm defines a panel engaging surface which may be generally parallel to the plane of the panel to which the electrical connector is mountable. The length of the cantilevered locking arm is such that the panel engaging surface at the end thereof is spaced from the mounting flange. In particular, the distance between the panel engaging surface and the mounting flange is a function of the thickness of the panel to which the electrical connector is to be mounted. In most embodiments, the distance between the mounting flange and the panel engaging surface of the locking arm may be slightly greater than the thickness of the panel to which the electrical connector is to be engaged.

As noted above, the floating panel mount of the subject invention comprises at least one pair of multiple cantilevered latch structures as described above. The latch structures in each pair may be disposed such that at least the upper and lower arms thereof lie in generally parallel spaced apart planes. Additionally, the latch structures in each pair may be generally oppositely oriented relative to one another. Thus, the cantilevered locking arm of one latch structure may extend back toward the mounting flange in a first direction, while the cantilevered locking arm of the other latch structure in the pair will extend back toward the mounting flange in a generally opposite direction. In particular, the locking arms in each pair may be in parallel planes. However, the latch structures in the pair may be disposed to engage separate panel mounting apertures, for example at opposite ends of a connector. Additionally, the latch structures may extend in either the same or different directions depending on the type of float required.

The relative dispositions of the two multiple cantilevered latch structures in each pair is such that the maximum cross-sectional dimension defined by the two cantilevered locking arms thereof exceeds the corresponding dimension in the mounting aperture of the panel. Thus, the two latch structures in each pair must undergo multiple cantilevered deflection to pass through the mounting aperture as explained below.

The above described floating panel mount comprising a pair of multiple cantilevered latch structures is employed by merely urging the pair of latch structures toward the mounting aperture in a panel. The leading cam surfaces disposed generally adjacent the respective intersections between the cantilevered upper and locking arms will initially guide the latch structures into a central alignment relative to the mounting aperture.

Continued movement of the latch structures toward the mounting aperture will urge the trailing cam surfaces on the respective cantilevered locking arms into contact with the panel. The forces generated by the contact between the panel and the trailing cam surfaces causes independent multiple deflection in the cantilevered arms of each latch structure. However, upon sufficient insertion of the latch structures into the aperture, the trailing cam surfaces of the respective locking arms will clear the panel, and the latch structures will be biasingly returned to substantially their initial position.

As noted above, the maximum cross-sectional dimension defined by the angularly cantilevered locking arms in each pair is greater than the cross-sectional dimension of the mounting aperture. As a result, the panel engaging surfaces of the respective locking arms will engage the surface of the panel to securely mount the electrical connector to the panel. However, the maximum cross-sectional dimension defined by the two cantilevered upper arms in the pair is significantly smaller than the cross-sectional dimension of the mounting aperture. As a result, substantial rotational float is achievable generally parallel to the plane of the panel.

The electrical connector mounted by the pair of latch structures can readily be removed from the panel by merely urging the locking arms of the latch structures toward one another to achieve sufficient cantilevered deflection to enable the locking arms to be urged through the mounting aperture in the panel.

BRIEF DESCRIPTION OF THE DRAWINGS

FIG. 4a is a top plan view of the floating panel mount of the connector in proximity to a mounting aperture in a panel.

FIG. 4b is a cross-sectional view taken along line 4b—4b in FIG. 4a.

FIG. 5a is a top plan view similar to FIG. 4a, but showing the floating panel mount of the connector further advanced into the mounting aperture.

FIG. 5b is a cross section taken along line 5b—5b in FIG. 5a.

FIG. 6b is a cross section taken along 6b—6b in FIG. 6a.

FIG. 7a is a top plan view of the floating panel mount in the fully mounted position relative to FIG. 7b is a cross section taken along 7b—7b in FIG. 7a.

DETAILED DESCRIPTION OF THE PREFERRED EMBODIMENT

Figure 1:
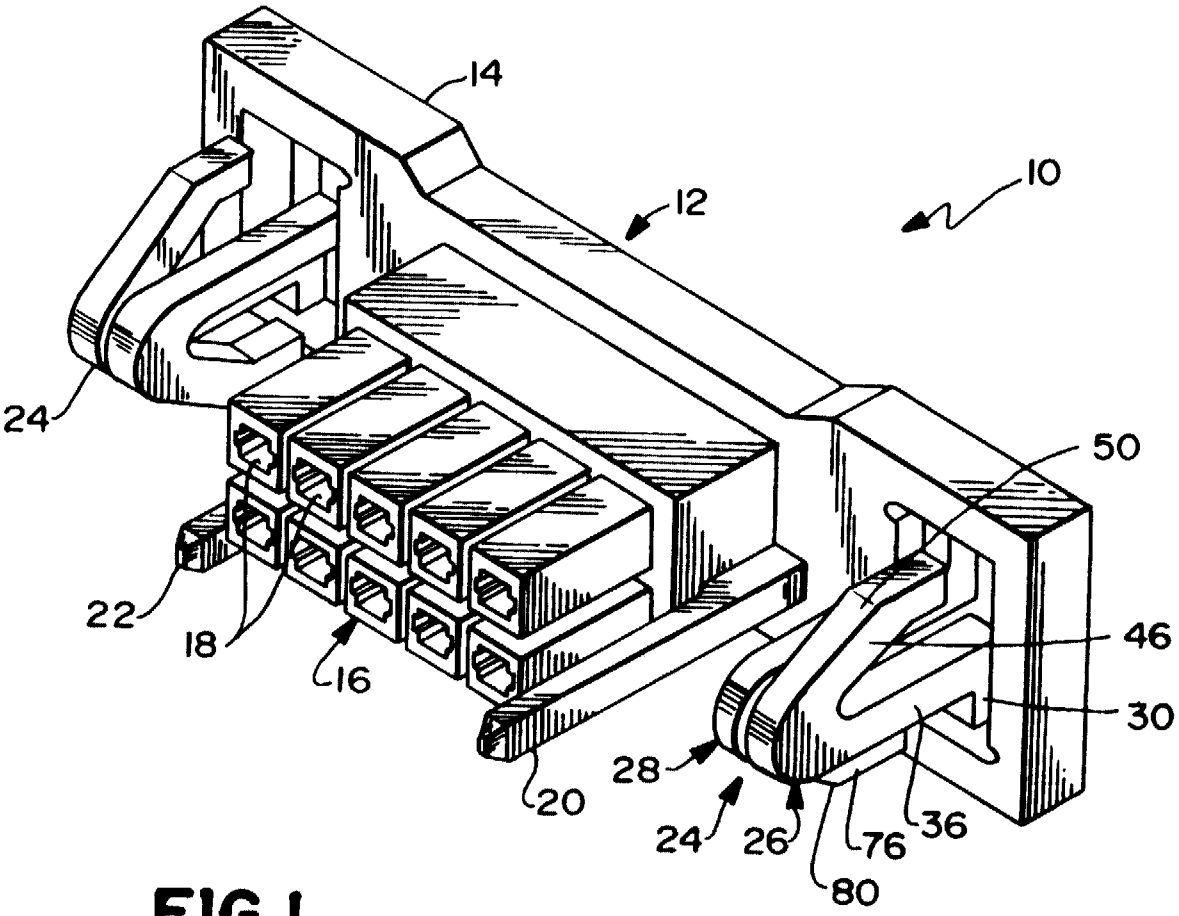
FIG. 1 is an perspective view of an electrical connector with the floating panel mount of the subject invention.
Figure 2:
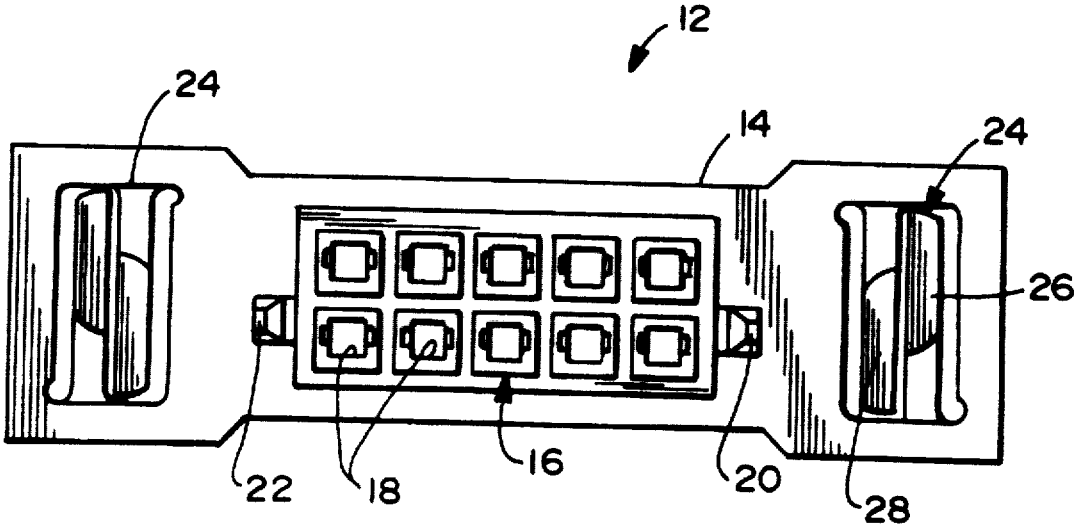
FIG. 2 is a front elevational view of the connector shown in FIG. 1.
Figure 3:
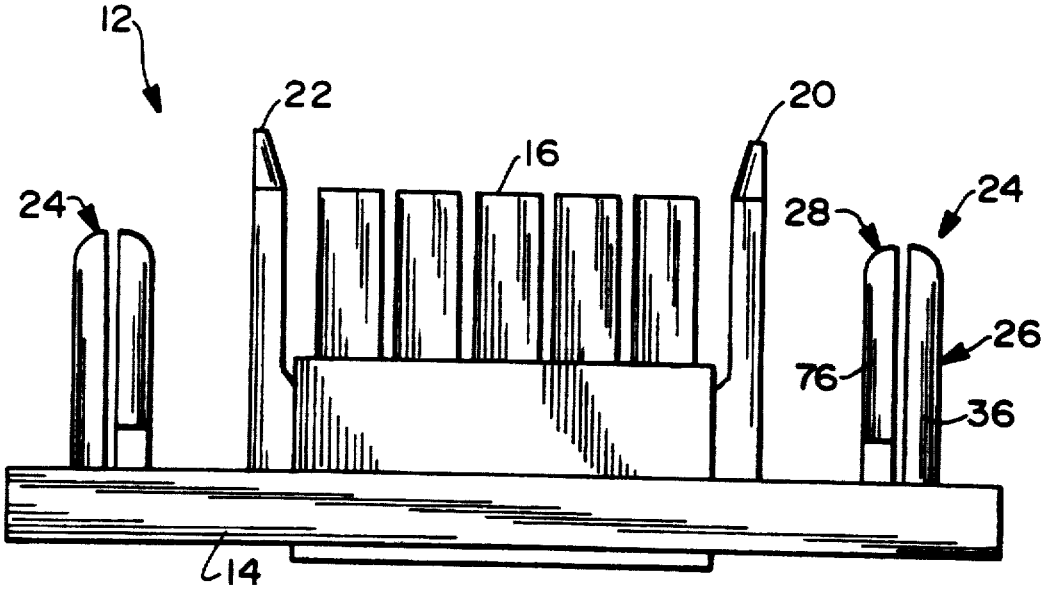
FIG. 3 is a top plan view of the connector shown in FIG. 1.

The electrical connector which incorporates the floating panel mount of the subject invention is illustrated in FIGS. 1-3, and is identified generally by the numeral 10. The connector 10 is intended for mounting to a panel, which is not depicted in FIGS. 1-3, but which is shown and described in detail below. In particular, the connector 10 shown in FIGS. 1-3 is the male half of a drawer connector assembly that is mountable to a generally planar panel and is mateable with a corresponding female drawer connector half which is also mountable to a panel. However, it will be appreciated by the person skilled in this art, that the floating panel mount described herein can be incorporated into connectors other than drawer connectors.

The connector 10 comprises a unitarily molded non-conductive plastic housing 12. In addition to the standard strength and electrical non-conductivity requirements, the plastic must exhibit a biasingly deflectable resiliency. For example, a 13% glass filled nylon has been found to be acceptable.

The housing 12 comprises a generally planar mounting flange 14 which is intended to be placed in generally face-to-face contact with the generally planar panel to which the connector 10 is to be mounted. The panel will be provided with mounting apertures as explained below. As noted above, the connector 10 is the male half of a drawer connector assembly, and therefore the housing 12 comprises forwardly projecting plug portions 16 which are dimensioned and configured to engage corresponding portions of the female connector (not shown). The plug portions 16 are formed with terminal-receiving cavities 18 molded therein and configured to lockingly engage electrically conductive terminals (not shown).

Many connectors, such as the drawer connector 10 shown in FIGS. 1-3 undergo a substantially blind matting, wherein precise initial mechanical alignment cannot be assured. To help achieve a proper mechanical alignment prior to the mechanical and electrical connection of the relatively fragile terminals in the male connector 10 and the corresponding female connector, the housing 12 is provided with forwardly projecting guides 20 and 22 which are configured and located to cooperate with a corresponding structure on the female connector (not shown). In particular, the female connector may be provided with a forwardly projecting shroud which will mechanically engage the forwardly projecting guides 20 and 22 to properly align the connector halves with one another.

To further facilitate the initial mechanical alignment of the connector halves, the unitarily molded housing 12 of the male connector 10 depicted in FIGS. 1-3 is provided with a pair of floating panel mounts which are substantially identical to one another and which are identified generally by the numeral 24. In particular, each floating panel mount is molded unitarily with the housing 12 and extends generally orthogonally from the mounting flange 14. Each floating panel mount 24 is operative to lockingly but releasably secure the connector 10 to a panel, but to also permit rotational float of the connector 10 relative to the panel and generally in the plane of the panel. This floating rotational movement of the connector 10 relative to the panel further facilitates the initial mechanical alignment of the connector 10 with a corresponding connector half, thereby facilitating the substantially blind mating to which many such panel mounted connectors are subjected.

The floating panel mount 24 is defined by a pair of oppositely directed multiple cantilevered latch structures 26 and 28. Each latch structure 26 and 28 is of unitary construction and extends unitarily from the mounting flange 12.

The first multiple cantilevered latch structure 26 comprises a lower arm 30 cantilevered from the mounting flange 14 of the housing 12. More particularly, as shown most clearly in FIGS. 4a and 4b, the cantilevered lower arm has a thickness indicated by dimension "a" which is less than the thickness "b" of the mounting flange 14. Additionally, the lower arm 30 is generally aligned with the rear surface 32 of the mounting flange 14. Thus, the cantilevered lower arm 30 is readily deflectable relative to the mounting flange 14 and away from the rearwardly facing surface 32 thereof. However, in its initial unbiased condition, the cantilevered lower arm 30 lies within and is generally parallel to the plane of the mounting flange 14, and thus will be generally parallel to the planar panel 34 in FIG. 4b to which the housing 12 will be mounted. In particular, the cantilevered lower arm 30 may have a thickness "a" of approximately 0.080 inch, while the mounting flange 14 may have a thickness "b" of approximately 0.150 inch.

An upper arm 36 is cantilevered from the end of the lower arm 30 remote from the mounting flange 14. More particularly, the cantilevered upper arm 36 is aligned generally orthogonal to, but unitary with, the cantilevered lower arm 30. The plane defined by the lower and upper arms 30 and 36 is substantially orthogonal to the plane defined by the mounting flange 14. The upper arm 36 has a thickness "c" which is significantly less than the diameter of the mounting aperture 35 in the panel 34. For example, the upper arm 36 may have a thickness of 0.090 inch, while the mounting aperture 35 may define a diameter of approximately 0.280 inch. The length of the upper arm 36 will be determined at least in part by the thickness of the panel 34 to which the housing 12 is to be mounted, as well as the amount of deflection desired for the upper arm 36 relative to the lower arm 30.

The intersection of the cantilevered lower and upper arms 30 and 36 defines an interior or concave corner 38, and an exterior or convex corner 40. The surface 42 of the cantilevered upper arm 36 extending from the concave corner 38 is generally arcuately shaped to conform to the generally circular configuration of the mounting aperture 35 in the panel 34. In particular, the curved surface 42 extends arcuately around an axis that is generally parallel to the cantilevered upper arm 36. The upper arm 36 further includes an arcuate leading cam surface 44 at the end thereof remote from the cantilevered connection of the upper arm 36 to the lower arm 30. The curvature of the leading cam surface 44 extends around an axis extending perpendicularly through the plane defined by the lower and upper arms 30 and 36. As will be explained further below, the leading cam surface 44 may contribute to the initial alignment of the multiple cantilevered latch structure 26 relative to the mounting aperture 35 in panel 34.

The multiple cantilevered latch structure 26 further comprises a locking arm 46 which is cantilevered from and angularly aligned to the end of the upper arm 36 remote from the lower arm 30. As shown most clearly in FIGS. 1 and 3, the cantilevered locking arm 46 is disposed generally in the plane defined by the lower and upper arms 30 and 36, with said plane being generally orthogonal to the plane of the mounting flange 14, as noted above. However, as shown most clearly in FIG. 4b, the lower arm 30 and the locking arm 46 extend from generally opposite longitudinal sides of the upper arm 36. The cantilevered locking arm 46 is angularly aligned to the upper arm 36 to extend generally back toward the mounting flange 14 from the end of the upper arm 36 remote from the mounting flange 14. In particular, the locking arm 46 intersects the upper arm 36 at an angle "d" of approximately 30°. The convex or exterior corner defined by the intersection of the cantilevered upper and locking arms 36 and 46 effectively defines a continuous arcuate extension of the leading cam surface 44.

The locking arm 46 comprises an end portion 48 which is generally curved and aligned substantially parallel to the upper arm 36. This curved portion 48 of the locking arm 46 defines a convex trailing cam surface 50 which will engage the panel 34 adjacent the aperture 35 therein to cause deflections in the multiple cantilevered latch structure 26, as explained and illustrated further below. The extreme end of the trailing cam surface 50 is generally parallel to the upper arm 36. The maximum distance between the surface 42 of the upper arm 36 and the portion of the trailing cam surface 50 parallel thereto is indicated by dimension "e" and is greater than the diameter of the mounting aperture 35. For example, the distance "e" may be approximately 0.31 inch for a connector to be mounted to a panel 34 having a mounting aperture 35 with a diameter of 0.280 inch. Preferably, the difference between the dimension "e" and the diameter of the mounting aperture 35 is 0.025–0.035 inch. As a result of this construction, the cantilevered locking arm 46 must be deflected relative to the cantilevered upper arm 36 for the latch structure to pass through the mounting aperture 35.

The extreme end of the locking arm 46 defines a panel engaging surface 52 which is generally parallel to the upper surface 33 of the mounting flange 14, but is spaced therefrom. In particular, the distance "f" between the panel engaging surface 52 and the upper surface 33 of mounting flange 14 is slightly greater than the thickness "g" of the panel 34. Thus, the panel 34 may be lockingly but releasably engaged intermediate the panel engaging surface 52 of the locking arm 46 and the forwardly facing surface 33 of the mounting flange 14.

The above defined construction of the multiple cantilevered latch structure 26 enables plural independent deflections of the various cantilevered members therein. In particular, the locking arm 46 is deflectable relative to the cantilevered upper arm 36. Similarly, the cantilevered upper and lower arms 36 and 30 are deflectable relative to one another. Finally, the cantilevered lower arm 30 can be deflected relative to the mounting flange 14.

The second multiple cantilevered latch structure 28 is substantially identical to the first latch structure 26 described above, but is generally reversed relative thereto. In particular, the second multiple cantilevered latch structure 28 comprises a lower arm 60 which is unitary with and cantilevered from the mounting flange 4 and is disposed generally in the plane thereof. The upper arm 66 is cantilevered from the end of the lower arm 60 remote from the mounting flange 14. A locking arm 76 extends angularly from the end of the upper arm 66 remote from the lower arm 60 to extend generally back toward the mounting flange 14. The cantilevered lower arm 60, upper arm 66 and locking arm 76 all lie in a generally common plane which is parallel to but slightly spaced from the plane of the first latch structure 26, as shown most clearly in FIGS. 2 and 3. Additionally, the upper arms 36 and 66 of the first and second latch structures 26 and 28 are generally parallel to one another, and are disposed substantially on opposite sides of a plane extending orthogonal to the plane of each latch structure. As a result of this construction, the latch structures 26 and 28 together define a major cross-sectional dimension "h" which substantially exceeds the diameter of the mounting aperture 35 in panel 34. However, the minor cross-sectional dimension "i" defined by the two upper arms 36 and 66 is less than the diameter of the mounting aperture 35.

The sequential steps leading to the engagement of the latch structures 26 and 28 with the panel 34 is shown in FIGS. 4a–4b through FIGS. 7a–7b. With reference to FIGS. 4a and 4b, the leading cam surface 44 of the first latch structure 26 and the corresponding leading cam surface of the second latch structure 28 may initially guide the latch structures 26, 28 to a relatively central position with respect to the mounting aperture 35. Continued movement of the housing 12 toward the panel 34 urges the trailing cam surfaces 50 and 80 of the locking arms 46 and 76 respectively into contact with portions of the panel 34 adjacent the mounting apertures 35.

As shown next in FIGS. 5a–5b continued movement of the housing 12 toward the panel 34 will cause the cantilevered upper arms 36 and 66 to deflect relative to the lower arms 30, 60, and may further cause the cantilevered lower arms 30 and 60 to deflect relative to the mounting flange 14. As depicted in FIG. 5b, the deflections of the lower and upper arms 30 and 36 of the first latch structure 26 will be in generally counterclockwise directions, while the deflections of the lower and upper arms 60 and 66 of the second latch structures 28 will be in generally clockwise directions.

Figure 6A:
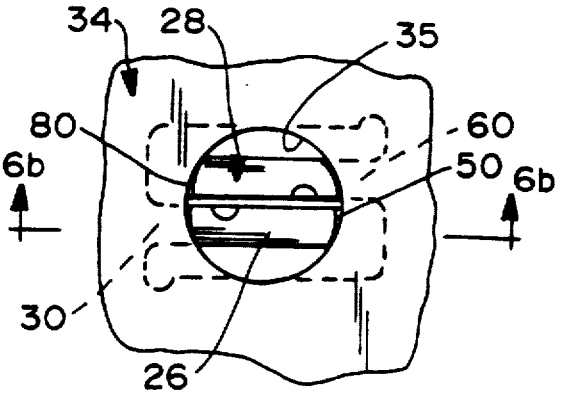
FIG. 6a is a top plan view of the floating panel mount similar to FIGS. 4a and 5a but showing the floating panel mount further advanced into the mounting aperture of a panel.
Figure 6B:
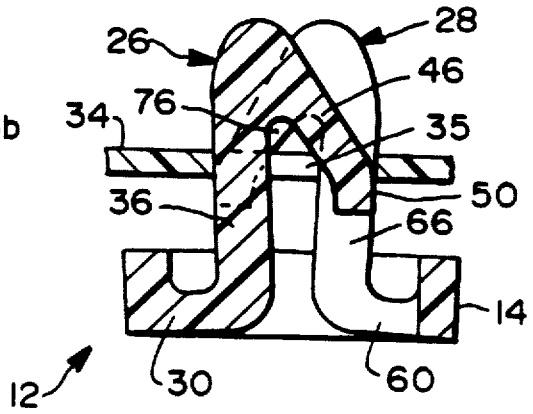

Further advancement of the housing 12 toward the panel 34 will continue the above described deflections of the upper arms 36, 66 and lower arms 30, 60, and will further generate deflection of the cantilevered locking arms 46, 76 relative to the respective upper arms 36 and 66, as shown in FIGS. 6a and 6b. This deflection of the locking arms 46 and 76 is necessitated by the relative diameter of the mounting aperture 35 and the greater maximum dimension "e" defined between surface 42 and 50 on the first latch structure 26, and the corresponding dimension on the second latch structure 28.

Figure 7A:
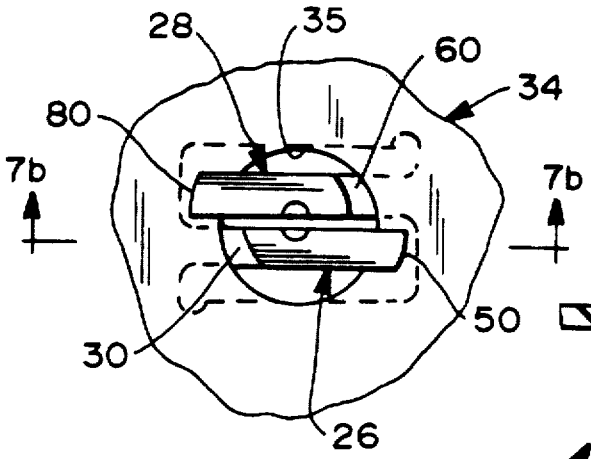
Figure 7B:
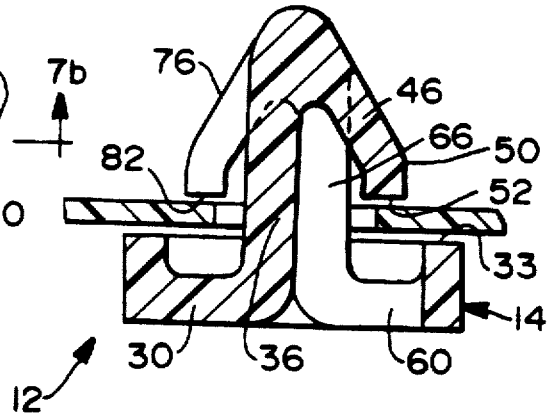

A still further movement of the housing 12 toward the panel 34 moves the panel engaging surfaces 52 and 82 of the latch structures 26 and 28 respectively clear of the mounting aperture 35. Thus, as shown in FIG. 7b, the latch structures 26 and 28 will return to arms 46 and 76. As noted above, and as shown clearly in FIG. 7b, the upper arms 36 and 66 define a combined minor cross-sectional dimension "i" significantly smaller than the diameter of the mounting aperture 35. Thus a substantial amount of rotational float of the housing 12 relative to the panel 34. Since the distance "e" exceeds the diameter of the mounting aperture 35, the housing 12 will be positively lockingly retained to the panel 34 at even extreme ranges of this floatable movement.

Although the housing 12 is lockingly retained to the panel 34 in the condition shown in FIG. 7b, the multiple cantilevered latch structures 26 and 28 readily enable selective separation of the housing 12 from the panel 34. In particular, the locking arms 46 and 76 may be urged toward one aothe with sufficient pressure to deflect the locking arms 46 and 76 relative to the upper arms 36 and 66. This deflection combined with corresponding deflections of the upper arms, 36, 66 and lower arms 30, 60 will enable the respective latch structures 26 and 28 to pass through the mounting apertures 35.

In summary, a floating panel mount structure may be molded unitarily with an electrical connector housing to achieve secure mounting of the housing to a panel, while simultaneously achieving desirable float therebetween. The floating panel mount comprises first and second multiple cantilevered latch structures. Each latch structure comprises a lower arm cantilevered from the mounting flange of the connector housing. An upper arm is cantilevered from the end of the lower arm remote from the mounting flange. A locking arm is cantilevered from the end of the upper arm remote from the lower arm, such that the lower, upper and locking arms all preferably lie in substantially a common plane. Furthermore, the cantilvered lower arm and the cantilevered locking arm extend angularly from opposed sides of the upper arm. The extreme end of the locking arm defines a panel engaging surface which is spaced from the mounting flange of the housing, such that a panel can be lockingly but releasably received therebetween. The maximum cross-sectional dimension defined by the upper arm and the locking arm cantilevered thereto preferably exceeds the maximum cross-sectional dimension of the mounting aperture into which the latch structure is insertable. Thus, the cantilevered locking arm must be deflected relative to the upper arm to pass through the mounting aperture. The first and second multiple cantilevered latch structures are oppositely directed relative to one another. Thus, plural independent cantilevered deflections are required to insert the latch structures through the mounting aperture of the panel. Upon complete insertion, the latch structures will biasingly return to their initial undeflected conditions such that the panel is lockingly retained between the panel engaging ends of the locking arms and the forwardly facing surfaces of the mounting flange. The upper arms are cross-sectionally significantly smaller than the maximum cross-sectional dimension of the mounting aperture. Thus, although the housing is securely retained on the panel, relative float therebetween is possible. The housing can be selectively removed from the panel by manually or otherwise deflecting the latch structures a sufficient amount for the panel engaging surfaces to clear the mounting aperture.

While the invention has been described with respect to a preferred embodiment, various changes can be made without departing from the scope of the invention as defined by the appended claims. For example, the cantilevered upper arms need not be perfectly parallel to one another and in contact with opposite sides of a plane of symmetry. Similarly, the cantilevered locking arms need not lie exactly in the same plane as the upper and lower cantilevered arms. Additionally, while the extremely efficient embodiment described above shows the latch structures as being unitary with the electrical connector housing, it is conceivable to provide separate connecting members that would extend through mounting apertures in both a connector housing and a panel. Furthermore, the latch structure may be disposed to engage separate panel apertures and may be oriented in generally the same or different directions depending on the type of float required.

We claim:

1. A floating panel mount for mounting an electrical connector to a panel, said panel having at least one mounting aperture therein, said floating panel mount comprising a pair of multiple cantilevered latch structures, each said latch structure including:

a mounting flange having opposed forward and rearward surfaces;

a lower arm cantilevered at a first end from said mounting flange extending generally parallel to and disposed between said forward and rearward surfaces of the mounting flange;

an upper arm cantilevered from a location on said lower arm remote from said first end and extending beyond the forward surface of the mounting flange; and a locking arm cantilevered from a location on said upper arm remote from said lower arm, said locking arm being angularly aligned to said upper arm, such that the locking arm and said lower arm extend from generally opposed sides of said upper arm and the angular alignment of said locking arm to said upper arm being such that said locking arm is directed generally toward the mounting flange, the length of said locking arm being such that an end of the locking arm remote from the upper arm is spaced from the forward surface of the mounting flange by a distance slightly greater than the thickness of the panel; and each of said latch structures being dimensioned and disposed to enable the panel to be engaged intermediate the locking arms thereof and the mounting flange, and to enable float relative to the engaged panel.

2. A floating panel mount as in claim 1 wherein in each latch structure, the upper arm and the locking arm cantilevered angularly therefrom define a maximum cross-sectional dimension slightly greater than the cross-sectional dimension of the mounting aperture in the panel.

3. A floating panel mount as in claim 2 wherein each said upper arm has a width less than the cross-sectional dimension of the mounting aperture in the panel.

4. A floating panel mount as in claim 1 wherein in each latch structure, the cantilevered locking arm is deflectable with respect to the upper arm.

5. A floating panel mount as in claim 4 wherein in each latch structure, the upper and lower cantilevered arms are deflectable relative to one another.

6. A floating panel mount as in claim 5 where in each latch structure the cantilevered lower arm is deflectable relative to the mounting flange.

7. A floating panel mount as in claim 1 wherein the multiple cantilevered latch structures are of unitary construction.

8. A floating panel mount as in claim 7 wherein the multiple cantilevered latch structures are unitary with an electrical connector housing.

9. A floating panel mount as in claim 1 wherein the upper arm, lower arm and locking arm of each multiple cantilevered latch structure lie generally in a single plane, and wherein the plane of the multiple cantilevered latch structures are generally parallel to one another.

10. A floating panel mount as in claim 1 wherein each said lower arm is disposed relative to the mounting flange to be in generally parallel spaced apart relationship to the panel.

11. An electrical connector housing for secure releasable connection to a panel having a plurality of mounting apertures therein, such that said housing is floatable relative to the panel, said housing comprising:

a generally planar mounting flange; and a plurality of pairs of multiple cantilevered latch structures unitary with the mounting flange, with the latch structures in each said pair being generally oppositely aligned relative to one another, each said latch structure comprising a lower arm deflectably cantilevered from the mounting flange and extending in generally parallel relation to the mounting flange, an upper arm deflectably cantilevered from said lower arm at a location thereon remote from said mounting flange, said upper and lower arms being angularly to one another, a locking arm deflectably cantilevered from said upper arm at a location therein remote from said lower arm, said locking arm being angularly aligned to said upper arm such that the remote end thereof is directed generally toward the mounting flange of said housing and such that said lower arm and said locking arm extend from generally opposite sides of the upper arm, an end of the locking arm remote from said upper arm being spaced from said mounting flange, said multiple cantilevered latch structures being aligned such that the upper arms thereof extend in generally the same direction from the mounting flange and such that the locking arms thereof extend from generally opposed sides of the upped arms, the locking arms being dimensioned and disposed such that the distance between the respective locking arm ends of each said pair exceeds the cross-sectional dimension of a said mounting aperture in the panel, the upper arms of each said pair being dimensioned and disposed to define a combined cross-sectional dimension which is less than the cross-sectional dimension of a said mounting aperture, whereby the arms of each latch structure are deflectable to enable the locking arms thereof to pass through a said mounting aperture but biasingly return to an undeflected condition for mounting the housing on the panel, and whereby the dimensions of the upper arms permit float of the mounted housing relative to the panel.

12. A housing as in claim 11 wherein the upper arm and the locking arm of each latch structure define a maximum cross-sectional dimension which is greater than the cross-sectional dimension of the mounting aperture, such that said locking arm retains the housing to the panel for all relative positions of float of the housing relative to the panel.

13. A housing as in claim 11 wherein the end of the locking arm remote from the upper arm defines a panel retaining surface which is spaced from the mounting flange by a distance slightly greater than the thickness of the panel.

14. A housing as in claim 1 wherein the mounting flange comprises opposed forward and rearward generally planar face, the forward face of the mounting flange defining the face thereof for mounting adjacent the panel, said lower arm of each said latch structure having a width less than the distance between said forward and rearward faces of the mounting flange, said lower arm being spaced from said forward face of said mounting flange such that a portion of each said lower arm is deflectable toward said forward face of said mounting flange.

15. A housing as in claim 11 wherein each of said latch structures comprises at least one generally arcuate cam surface disposed to contact the panel during mounting of the housing to the panel, such that the contact between said cam surface and said panel deflects at least selected ones of said arms comprising each of said latch structures.

16. A unitarily molded electrical connector housing for mounting to a generally planar panel having opposed surfaces and having at least one mounting aperture extending therethrough, said housing comprising:

a generally planar mounting flange for mounting in generally face-to-face contact with one said surface of said panel; and at least one pair of multiple cantilevered latch structures, each of said latch structure comprising a lower arm deflectably cantilevered from said mounting flange and extending generally parallel thereto, an upper arm deflectably cantilevered from said lower arm at a location thereon remote from said mounting flange, said upper arm being angularly aligned to said lower arm, a locking arm deflectably cantilevered from said upper arm at a location thereon remote from said lower arm, said locking arm being angularly aligned to said upper arm and extending from a side thereof generally opposite the lower arm, the upper arms of said latch structures extending in generally the same direction from said mounting flange, the locking arms of said structures extending in generally opposed directions from one another, each said locking arm comprising an end portion spaced from said upper arm and spaced from said mounting flange by a distance slightly greater than the distance between the opposed surfaces of said panel, such that said panel can be engaged intermediate the mounting flange and the ends of said locking arms.

17. A housing as in claim 16 wherein the maximum distance between points on the two locking arms in said pair of latch structures is greater than the cross-sectional dimension of the mounting aperture, such that said latch structures must be deflected to pass through the mounting aperture.

18. A housing as in claim 16 wherein the maximum cross-sectional dimension defined between points on said upper arms of said pair of latch structures measured parallel to said mounting flange is less than the cross sectional dimension of the mounting aperture.

19. A housing as in claim 16 wherein the maximum distance measured parallel to the plane of said mounting flange and connecting points on said upper arm and the locking arm cantilevered therefrom in each said latch structure is greater than the maximum cross-sectional dimension of said mounting aperture.

20. A floating panel mount for mounting an electrical connector to a panel, said panel including at least one mounting aperture therein, said floating panel mount comprising a pair of multiple cantilevered latch structures, each said latch structure including:

a mounting flange having opposed forward and rearward faces;

a lower arm cantilevered from said mounting flange;

an upper arm cantilevered from a location on said lower arm remote from said mounting flange; and a locking arm cantilevered from a location on said upper arm remote from said lower arm; said lower arm, upper arm and locking arm being angularly aligned with respect to each other to define a latch structure which extends forwardly from the forward face of the mounting flange with said locking arm directed generally rearwardly toward the mounting flange, the length of said locking arm being such that the end of the locking arm remote from the upper arm is spaced from the forward surface of the mounting flange by a distance slightly greater than the thickness of the panel;

each said latch structure having a first cross-sectional dimension measured in a plane parallel to said mounting flange and defined between the forward face of the mounting flange and said end of the locking arm remote from the upper arm, said first cross-sectional dimension being less than a diametric cross-sectional dimension of the mounting aperture in the panel, and a second maximum cross-sectional dimension measured in a plane parallel to said mounting flange defined forwardly of and adjacent to the remote end of the locking arm which is slightly greater than the diametric cross-sectional dimension of the mounting aperture in the panel;

each of said latch structures being resiliently deflectable to permit insertion of each latch structure into said at least one panel mounting aperture to enable the panel to be engaged intermediate the locking arm and the mounting flange of each latch structure and to enable float relative to the engaged panel.

21. A floating panel mount as in olaim 20, wherein each of said multiple cantilevered latch structures are of unitary construction.

22. A floating panel mount as in claim 20, wherein the multiple cantilevered latch structures are unitary with an electrical connector housing.

23. A floating panel mount as in claim 20, wherein the panel includes one mounting aperture, and said pair of latch structures are disposed in side by side relationship such that their lower arms extend parallel to and adjacent one another and such that the locking arms of each said latch structure extend in opposed directions.

24. A floating panel mount as in claim 20, wherein the panel includes a pair of spaced apart mounting apertures and the latch structures in said pair of latch structures are correspondingly spaced from one another.

*25. An electrical connector for mounting to an apertured panel and for mating with another connecting device movable relative to the electrical connector in a mating direction along a mating axis generally perpendicular to the panel, said electrical connector comprising:*

*a unitarily molded non-conductive plastic housing;*

*said housing having a mating portion with a plurality of terminal receiving cavities extending parallel to the connector mating axis; and*

*floating panel mounting means formed integrally and of one piece with said housing and adapted to be received in an aperture in the panel when the connector is moved parallel to said mating axis into engagement with the panel;*

*said panel mounting means including stop means defined on said housing engageable with a first side of the panel; and*

*said panel mounting means including a floating portion received with substantial clearance in the panel aperture permitting the connector substantial rotational motion, and a retaining portion engageable with a second surface of the panel.*

*26. An electrical connector as claimed in claim 25, said panel mounting means being movable into engagement with the panel in a direction opposite to the mating direction.*

*27. An electrical connector as claimed in claim 26, said mating portion extending beyond said second surface of said panel when said connector is mounted to the apertured panel.*

*28. An electrical connector as claimed in claim 27 wherein said mating portion extends through one aperture in the panel and said floating portion extends through another aperture in the panel.*

*29. An electrical connector as claimed in claim 25 wherein said panel mounting means includes a pair of said floating portions located on opposite sides of said mating portion.*

* * * * *